(12) United States Patent
Levie (10) Patent No.: US 8,505,624 B2
(45) Date of Patent: Aug. 13, 2013

(54) INTEGRAL PULL-THROUGH CENTRALIZER

(75) Inventor: Iain Levie, Spring, TX (US)

(73) Assignee: Halliburton Energy Services, Inc., Duncan, OK (US)

(*) Notice: Subject to any disclaimer, the term of this patent is extended or adjusted under 35 U.S.C. 154(b) by 341 days.

(21) Appl. No.: 12/964,605

(22) Filed: Dec. 9, 2010

(65) Prior Publication Data

US 2012/0145410 A1 Jun. 14, 2012

(51) Int. Cl.
*E21B 17/10* (2006.01)

(52) U.S. Cl.
USPC .................... 166/241.6; 166/241.1

(58) Field of Classification Search
USPC ............................ 166/241.1–241.7
See application file for complete search history.

(56) References Cited

U.S. PATENT DOCUMENTS

| | | | |
|---|---|---|---|
| 2,220,237 A | 11/1940 | Hall | |
| 2,228,649 A | 1/1941 | Welles | |
| 2,482,985 A | 9/1949 | Lockwood | |
| 2,998,074 A | 8/1961 | Casady et al. | |
| 3,177,946 A | 4/1965 | Hall, Sr. | |
| 3,209,836 A | 10/1965 | Hall, Sr. | |
| 3,566,965 A | 3/1971 | Solum | |
| 3,852,923 A | 12/1974 | Hess | |
| 4,785,852 A | 11/1988 | Okahashi et al. | |
| 4,794,986 A | 1/1989 | Langer | |
| 5,097,905 A | 3/1992 | Goodwin | |
| 5,228,509 A | 7/1993 | Ungemach et al. | |
| 5,358,039 A | 10/1994 | Fordham | |
| 5,937,948 A | 8/1999 | Robbins, III | |
| 5,988,276 A | 11/1999 | Oneal | |
| 6,065,537 A | 5/2000 | Evans et al. | |
| 6,102,118 A | 8/2000 | Moore | |
| 6,209,638 B1 * | 4/2001 | Mikolajczyk | 166/241.1 |
| 6,285,014 B1 | 9/2001 | Beck et al. | |
| 6,371,203 B2 | 4/2002 | Frank et al. | |
| 6,457,517 B1 | 10/2002 | Goodson et al. | |
| 6,637,511 B2 | 10/2003 | Linaker | |
| 6,679,325 B2 | 1/2004 | Buytaert | |
| 7,231,975 B2 | 6/2007 | Lavaure et al. | |

(Continued)

FOREIGN PATENT DOCUMENTS

| | | |
|---|---|---|
| CN | 1837572 A | 9/2006 |
| CN | 100404784 C | 7/2008 |

(Continued)

OTHER PUBLICATIONS

Patent application entitled "Improved Limit Collar," by William Iain Elder Levie, filed Apr. 25, 2011 as U.S. Appl. No. 13/093,242.

(Continued)

*Primary Examiner* — Giovanna Wright (74) *Attorney, Agent, or Firm* — John W. Wustenberg; Conley Rose, P.C.

(57) ABSTRACT

A centralizer comprises a first body portion, a second body portion, a plurality of bow springs connecting the first body portion to the second body portion, and a window disposed in the first body portion. The centralizer may also have a wellbore tubular disposed longitudinally within the first body portion, the second body portion, and the plurality of bow springs, and an upset disposed on the surface of the wellbore tubular and within the window.

20 Claims, 5 Drawing Sheets

(56) References Cited

U.S. PATENT DOCUMENTS

| | | |
|---|---|---|
| 7,516,782 B2 | 4/2009 | Sheiretov et al. |
| 7,748,476 B2 | 7/2010 | Krueger |
| 7,845,061 B2 | 12/2010 | Buytaert et al. |
| 7,861,744 B2 | 1/2011 | Fly et al. |
| 8,141,627 B2 | 3/2012 | Krieg et al. |
| 8,162,050 B2 | 4/2012 | Roddy et al. |
| 8,245,777 B2 | 8/2012 | Garner |
| 8,281,857 B2 | 10/2012 | Willberg et al. |
| 8,291,975 B2 | 10/2012 | Roddy et al. |
| 8,297,352 B2 | 10/2012 | Roddy et al. |
| 8,297,353 B2 | 10/2012 | Roddy et al. |
| 8,302,686 B2 | 11/2012 | Roddy et al. |
| 8,316,936 B2 | 11/2012 | Roddy et al. |
| 2001/0037883 A1 | 11/2001 | Veneruso et al. |
| 2002/0139537 A1 | 10/2002 | Young et al. |
| 2002/0139538 A1 | 10/2002 | Young et al. |
| 2008/0035331 A1 | 2/2008 | Buytaert |
| 2008/0196900 A1 | 8/2008 | Leibfried et al. |
| 2008/0283236 A1 | 11/2008 | Akers et al. |
| 2009/0308615 A1 | 12/2009 | Buytaert |
| 2010/0218956 A1 | 9/2010 | Buytaert et al. |
| 2011/0030973 A1* | 2/2011 | Jenner ............ 166/382 |
| 2011/0042102 A1 | 2/2011 | Buytaert |
| 2011/0146971 A1 | 6/2011 | Buytaert et al. |
| 2011/0187556 A1 | 8/2011 | Roddy et al. |
| 2011/0199228 A1 | 8/2011 | Roddy et al. |
| 2012/0145410 A1 | 6/2012 | Levie |
| 2012/0145414 A1 | 6/2012 | Nutley et al. |
| 2012/0186808 A1 | 7/2012 | Lively et al. |
| 2012/0186828 A1 | 7/2012 | Lively et al. |
| 2012/0267121 A1 | 10/2012 | Levie |
| 2013/0068483 A1 | 3/2013 | Levie et al. |

FOREIGN PATENT DOCUMENTS

| | | |
|---|---|---|
| DE | 102005040482 A1 | 3/2007 |
| GB | 2431664 A | 5/2007 |
| WO | 0066874 | 11/2000 |
| WO | 2008144249 A2 | 11/2008 |
| WO | 2011025488 A1 | 3/2011 |
| WO | 2012076850 A1 | 6/2012 |
| WO | 2012101401 A2 | 8/2012 |
| WO | 2012101401 A3 | 8/2012 |
| WO | 2012101402 A2 | 8/2012 |
| WO | 2012101402 A3 | 8/2012 |
| WO | 2012146892 A2 | 11/2012 |

OTHER PUBLICATIONS

Patent application entitled "Composite Stop Collar," by William Iain Elder Levie, filed Sep. 20, 2011 as U.S. Appl. No. 13/236,987.

Foreign communication from a related counterpart application—International Search Report and Written Opinion, PCT/GB2012/000066, Nov. 22, 2012, 10 pages.

Foreign communication from a related counterpart application—International Search Report and Written Opinion, PCT/GB2012/000067, Nov. 23, 2012, 11 pages.

Patent application entitled "Composite bow centralizer," by Glenn Lively, et al., filed Jan. 25, 2011 as U.S. Appl. No. 13/013,259.

Patent application entitled "Composite bow centralizer," by Glenn Lively, et al., filed Jan. 25, 2011 as U.S. Appl. No. 13/013,266.

"Specifications for bow-spring centralizers," API Specification 10D, Mar. 2002, 6th edition, 24 pages, American Petroleum Institute, Washington, D.C.

Foreign communication from a related counterpart application—International Search Report, PCT/GB2011/001704, May 15, 2012, 5 pages.

Office Action dated Mar. 27, 2013 (33 pages), U.S. Appl. No. 13/013,259, filed Jan. 25, 2011.

Office Action dated Apr. 1, 2013 (33 pages), U.S. Appl. No. 13/013,266, filed Jan. 25, 2011.

Foreign communication from a related counterpart application—International Preliminary Report on Patentability, PCT/US2009/055193, Feb. 28, 2012, 6 pages.

Office Action dated Apr. 26, 2013 (25 pages), U.S. Appl. No. 13/093,242, filed Apr. 25, 2011.

* cited by examiner

INTEGRAL PULL-THROUGH CENTRALIZER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wellbores are sometimes drilled into subterranean formations that contain hydrocarbons to allow recovery of the hydrocarbons. Some wellbore servicing methods employ wellbore tubulars that are lowered into the wellbore for various purposes throughout the life of the wellbore. Since wellbores are not generally perfectly vertical, centralizers are used to maintain the wellbore tubulars aligned within the wellbore. Alignment may help prevent any friction between the wellbore tubular and the side of the wellbore wall or casing, potentially reducing any damage that may occur. Common spring centralizers use stop collars located at either end of the centralizer to maintain the centralizer position relative to the wellbore tubular as the tubular is conveyed into and out of the wellbore. The spring centralizer may be free to move within the limits of the stop collars. Spring centralizers with stop collars are not suitable for all applications within a wellbore and improvements in centralizers may still be made.

SUMMARY

Disclosed herein is a centralizer, comprising a first body portion, a second body portion, a plurality of bow springs connecting the first body portion to the second body portion, and a window disposed in the first body portion. The centralizer may also comprise a second window disposed in the second body portion. The centralizer may also comprise a third body portion disposed between a first portion of the plurality of bow springs and a second portion of the plurality of bow springs. The window may have rounded corners, and the plurality of bow springs may be rotatably coupled to the first body portion or the second body portion. The centralizer may also have a wellbore tubular disposed longitudinally within the first body portion, the second body portion, and the plurality of bow springs, and an upset disposed on the surface of the wellbore tubular and within the window. No collar stops may be disposed about the wellbore tubular to restrain the movement of the centralizer. The upset may have a height equal to or less than the height of the first body portion, the second body portion, or both, and the axial length of the window may be greater than the axial length of the upset by at least one half of the height of the bows from the wellbore tubular outer diameter.

Also disclosed herein is a method comprising providing a centralizer disposed about a wellbore tubular comprising an upset disposed on a surface of the wellbore tubular, wherein the centralizer comprises a first body portion, a second body portion, a plurality of bow springs connecting the first body portion to the second body portion, and a window disposed in the first body portion, and wherein the upset is disposed within the window, placing wellbore tubular in a wellbore disposed in a subterranean formation. The upset may comprise a metal, an alloy, a polymer, a composite, or any combination thereof. The wellbore may comprise at least one close tolerance restriction, and the close tolerance restriction may comprise a restriction with an annular diameter difference of between about 1.5 inches and about 0.125 inches. The presence of a close tolerance restriction results from a flush connection, a premium connection, or any combination thereof. The wellbore tubular may comprise a tubular string, and wherein the tubular string further comprises a plurality of centralizers disposed about the tubular string. The plurality of bow springs may be rotatably coupled to the first body portion and the second body portion. The centralizer may also comprise a third body portion disposed between a first portion of the plurality of bow springs and a second portion of the plurality of bow springs. The wellbore tubular may comprise a casing, a drill pipe, coiled tubing, production tubing, or a rod string.

Further disclosed herein is a method comprising providing a wellbore tubular, disposing a centralizer about the wellbore tubular, wherein the centralizer comprises a first body portion, a second body portion, a plurality of bow springs connecting the first body portion to the second body portion, and a window disposed in the first body portion, preparing a surface of the wellbore tubular within the window, covering at least a portion of the wellbore tubular within the window with an injection mold, and injecting a composite material into a space between the wellbore tubular and the injection mold to form an upset. The method may also comprise removing the injection mold, and placing the wellbore tubular comprising the centralizer within a wellbore. The plurality of bow springs may be rotatably coupled to the first body portion and the second body portion.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," or "upstream" meaning toward the surface of the wellbore and with "down," "lower," "downward," or "downstream" meaning toward the terminal end of the well, regardless of the wellbore orientation. The various characteristics mentioned above, as well as other features and characteristics described in more detail below, will be readily apparent to those skilled in the art with the aid of this disclosure upon reading the following detailed description of the embodiments, and by referring to the accompanying drawings.

Disclosed herein is a centralizer for use with a wellbore tubular. The centralizer described herein may be coupled to a wellbore tubular through the use of a window in a first body portion with an upset disposed therein. The use of the window and the upset may allow the centralizer to be pulled into the wellbore, rather than being pushed as occurs with traditional centralizers. The ability to pull the centralizer into the wellbore may reduce the starting force associated with the use of the centralizer, offering an advantage over traditional centralizers. Further, the use of the window with an upset disposed therein rather than traditional collar stops allows the centralizer of the present disclosure to be used in close tolerance wellbores. Further, the centralizers of the present disclosure may be quickly installed on existing tubing and may not require dedicated subs for their use. The centralizer may be installed by forming the upset directly within the window when the centralizer is placed on a wellbore tubular, such as an existing section of casing. This production method may allow the centralizer to be installed at the well site or within the oilfield rather than requiring a dedicated manufacturing facility and dedicated subs for attaching the centralizers to a wellbore tubular string. These and other advantages will be apparent in light of the description contained herein.

Figure 1:
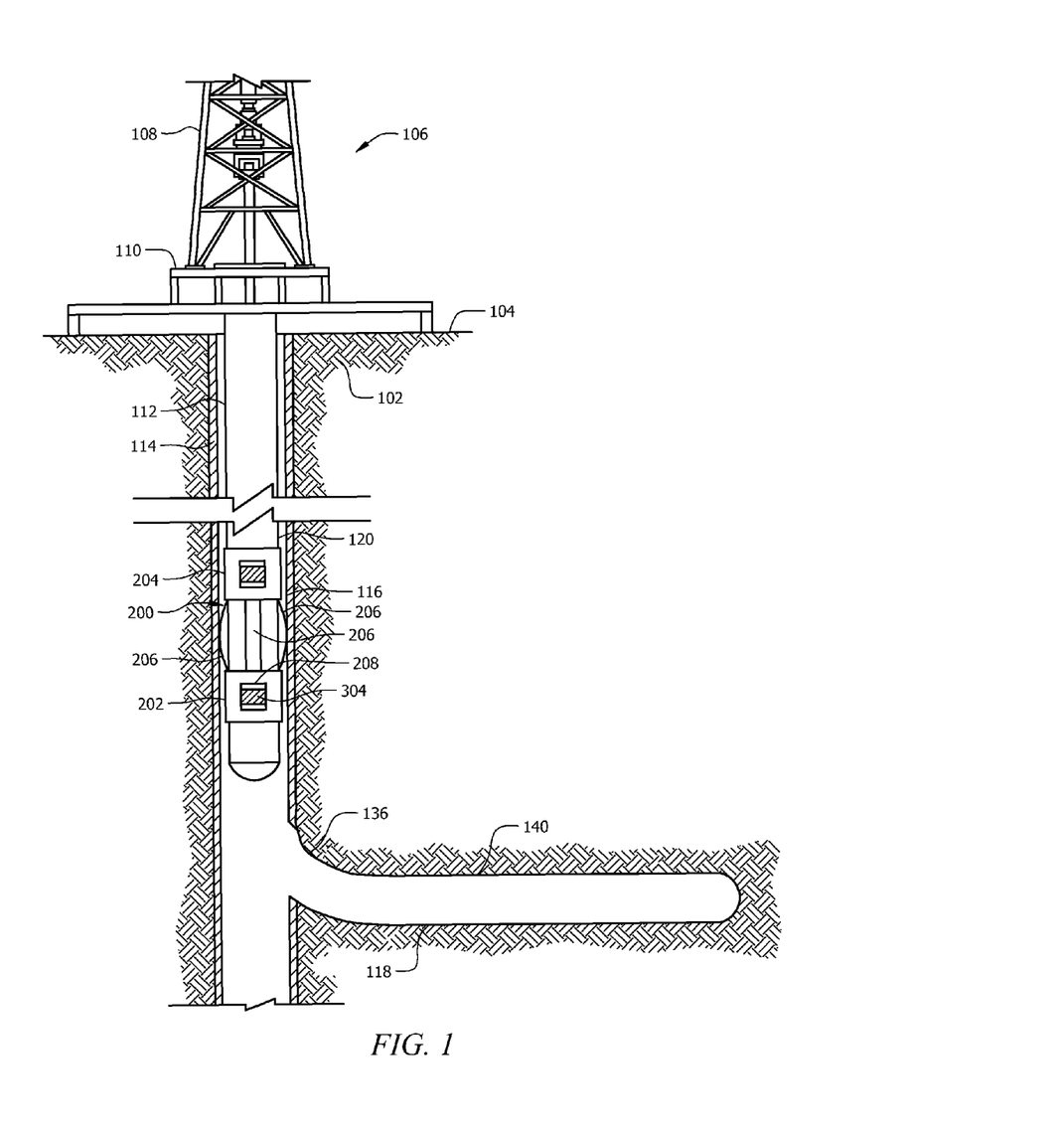
FIG. 1 is a cut-away view of an embodiment of a wellbore servicing system according to an embodiment.

Referring to FIG. 1, an example of a wellbore operating environment is shown. As depicted, the operating environment comprises a drilling rig 106 that is positioned on the earth's surface 104 and extends over and around a wellbore 114 that penetrates a subterranean formation 102 for the purpose of recovering hydrocarbons. The wellbore 114 may be drilled into the subterranean formation 102 using any suitable drilling technique. The wellbore 114 extends substantially vertically away from the earth's surface 104 over a vertical wellbore portion 116, deviates from vertical relative to the earth's surface 104 over a deviated wellbore portion 136, and transitions to a horizontal wellbore portion 118. In alternative operating environments, all or portions of a wellbore may be vertical, deviated at any suitable angle, horizontal, and/or curved. The wellbore may be a new wellbore, an existing wellbore, a straight wellbore, an extended reach wellbore, a sidetracked wellbore, a multi-lateral wellbore, and other types of wellbore for drilling and completing one or more production zones. Further the wellbore may be used for both producing wells and injection wells.

A wellbore tubular string 120 comprising a centralizer 200 may be lowered into the subterranean formation 102 for a variety of workover or treatment procedures throughout the life of the wellbore. The embodiment shown in FIG. 1 illustrates the wellbore tubular 120 in the form of a casing string being lowered into the subterranean formation. It should be understood that the wellbore tubular 120 comprising a centralizer 200 is equally applicable to any type of wellbore tubular being inserted into a wellbore, including as non-limiting examples drill pipe, production tubing, rod strings, and coiled tubing. The centralizer 200 may also be used to centralize various subs and workover tools. In the embodiment shown in FIG. 1, the wellbore tubular 120 comprising centralizer 200 is conveyed into the subterranean formation 102 in a conventional manner and may subsequently be secured within the wellbore 114 by filling an annulus 112 between the wellbore tubular 120 and the wellbore 114 with cement.

The drilling rig 106 comprises a derrick 108 with a rig floor 110 through which the wellbore tubular 120 extends downward from the drilling rig 106 into the wellbore 114. The drilling rig 106 comprises a motor driven winch and other associated equipment for extending the casing string 120 into the wellbore 114 to position the wellbore tubular 120 at a selected depth. While the operating environment depicted in FIG. 1 refers to a stationary drilling rig 106 for lowering and setting the wellbore tubular 120 comprising the centralizer 200 within a land-based wellbore 114, in alternative embodiments, mobile workover rigs, wellbore servicing units (such as coiled tubing units), and the like may be used to lower the wellbore tubular 120 comprising the centralizer 200 into a wellbore. It should be understood that a wellbore tubular 120 comprising the centralizer 200 may alternatively be used in other operational environments, such as within an offshore wellbore operational environment.

In alternative operating environments, a vertical, deviated, or horizontal wellbore portion may be cased and cemented and/or portions of the wellbore may be uncased. For example, uncased section 140 may comprise a section of the wellbore 114 ready for being cased with wellbore tubular 120. In an embodiment, a centralizer 200 may be used on production tubing in a cased or uncased wellbore. In an embodiment, a portion of the wellbore 114 may comprise an underreamed section. As used herein, underreaming refers to the enlargement of an existing wellbore below an existing section, which may be cased in some embodiments. An underreamed section may have a larger diameter than a section upward from the underreamed section. Thus, a wellbore tubular passing down through the wellbore may pass through a smaller diameter passage followed by a larger diameter passage.

Regardless of the type of operational environment the centralizer 200 is used, it will be appreciated that the centralizer 200 serves to aid in guiding the wellbore tubular 120 through the wellbore 114. As described in greater detail below, the centralizer 200 comprises a first body portion 202, a second body portion 204, and a plurality of bow springs 206 connecting the first body portion to the second body portion. The centralizer serves to center the wellbore tubular (e.g., casing string 120) within the wellbore 114 as the wellbore tubular 120 is conveyed within the wellbore 114. The centralizer 200 described herein may be used to guide the wellbore tubular 120 through close tolerance restrictions within the wellbore 114. In an embodiment, the centralizer 200 described herein may be used in close tolerance wellbores in which traditional bow spring centralizers using stop collars would not fit.

Figure 2:
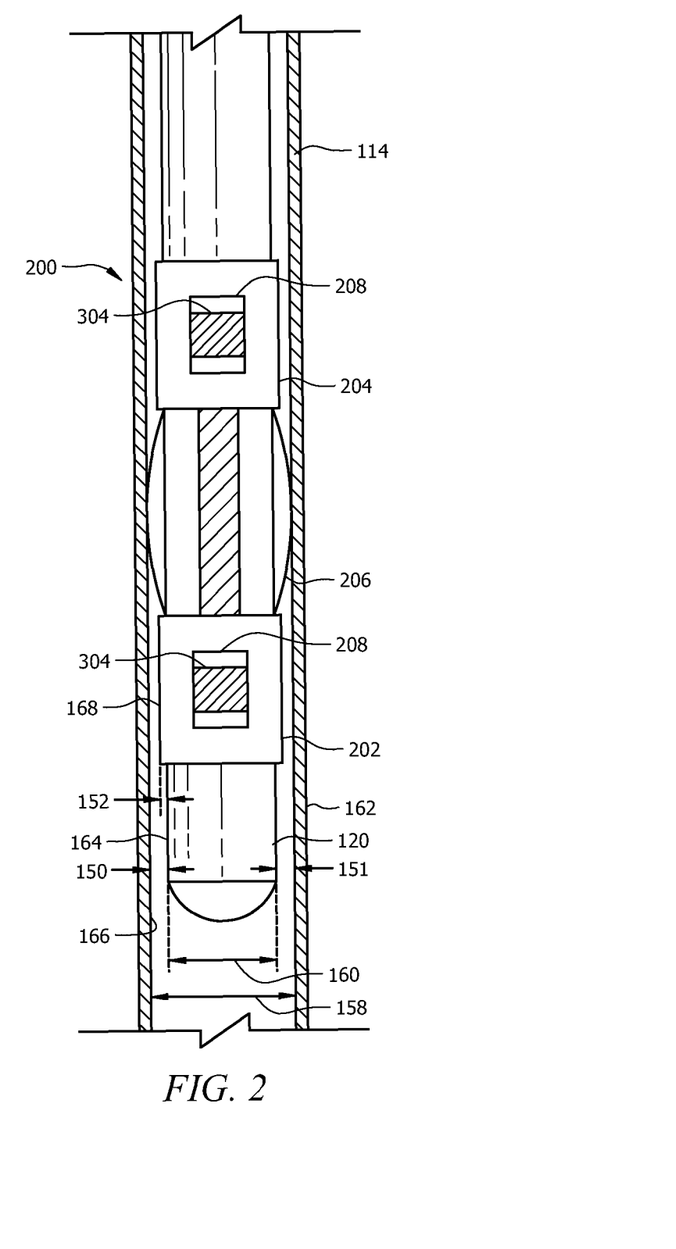
FIG. 2 is a plan view of a centralizer according to an embodiment.

As shown in FIG. 2, the centralizer 200 described herein may be used in a wellbore 114 comprising one or more close tolerance restrictions. A close tolerance restriction generally refers to a restriction in which the inner diameter 158 of the restriction passage is near the outer diameter 160 of a wellbore tubular 120, a tool, or other wellbore apparatus passing through the restriction. The close tolerance restrictions may result from various wellbore designs such as decreasing diameter casing strings, underreamed sections within a wellbore, or collapsed wellbores or casings. For example, passing a smaller diameter casing 120 through a larger diameter casing 162 can create a close tolerance restriction between the outer surface 164 of the smaller diameter casing 120 and the inner surface 166 of the larger diameter casing 162. Examples of casing sizes that may result in close tolerance restrictions within a wellbore 114 are shown in Table 1.

TABLE 1

Close Tolerance Restrictions Casing Examples

| Smaller Diameter Casing Size (inches) | Passing through | Larger Diameter Casing Size (inches) |
|---|---|---|
| 3.5 | | 4.5 |
| 4.5 | | 5.5 |
| 5 | | 6 |
| 5.5 | | 6 |
| 6.625 | | 7 |
| 7 | | 8.5 |
| 7.625 | | 8.625 |
| 7.75 | | 8.5 |
| 9.625 | | 10.625 |
| 9.875 | | 10.625 |
| 10.75 | | 12 |
| 11.875 | | 13.375 |
| 13.375 | | 14.75 |
| 16 | | 17 |
| 20 | | 22 |

The designation of a restriction in a wellbore 114 as a close tolerance restriction may vary depending on a number of factors including, but not limited to, the tolerances allowed in the wellbore, the tortuosity of the wellbore, the need to use flush or near flush connections, the weight of the casing used in the wellbore, the presence of fluid and/or solids in the wellbore, etc. The tolerances allowed in the wellbore may vary from wellbore to wellbore. The term "annular diameter difference" may be used herein to characterize the tolerances in the wellbore 114 and refers to the total width of the annulus (i.e., the sum of annular width 150 and annular width 151) in the close tolerance restriction. The annular diameter difference is calculated as the difference between the inner diameter 158 of the restriction passage and the outer diameter 160 of the wellbore tubular 120 passing through the restriction. In an embodiment, a close tolerance restriction may have an annular diameter difference of about 0.125 inches, about 0.2 inches, about 0.3 inches, about 0.4 inches, about 0.5 inches, about 0.6 inches, about 0.7 inches, about 0.8 inches, about 0.9 inches, about 1.0 inch, about 1.1 inches, about 1.2 inches, about 1.3 inches, about 1.4 inches, or about 1.5 inches. While an upper limit of about 1.5 inches is used, the upper limit may be greater or less than 1.5 inches depending on the other considerations and factors (including for example, a risk/safety factor) for determining if a close tolerance restriction is present in a wellbore. The tortuosity of the wellbore refers to the deviation of the wellbore from a straight hole. A restriction in a wellbore is more likely to be considered a close tolerance restriction as the tortuosity of the wellbore increases. Further, a wellbore tubular with a flush or near flush connection refers to wellbore tubulars without or with only insubstantial upsets along the outer surface, for example at the connections between joints of the wellbore tubulars. The use of flush or near flush connections may create close tolerance restrictions along greater portions of the wellbore tubulars. Finally, the weight of the wellbore tubular may affect both the flexibility of the wellbore tubular string and the annular diameter difference between the wellbore wall or the inner surface 166 of a larger diameter casing string 162, depending on whether the wellbore 114 has been cased, and the outer surface 164 of a smaller diameter casing string 120. The use of premium grade casing and/or premium grade connections may indicate that the difference between inner and outer pipe diameters is small and indicate that a close tolerance restriction exists within the wellbore 114.

Figure 3:
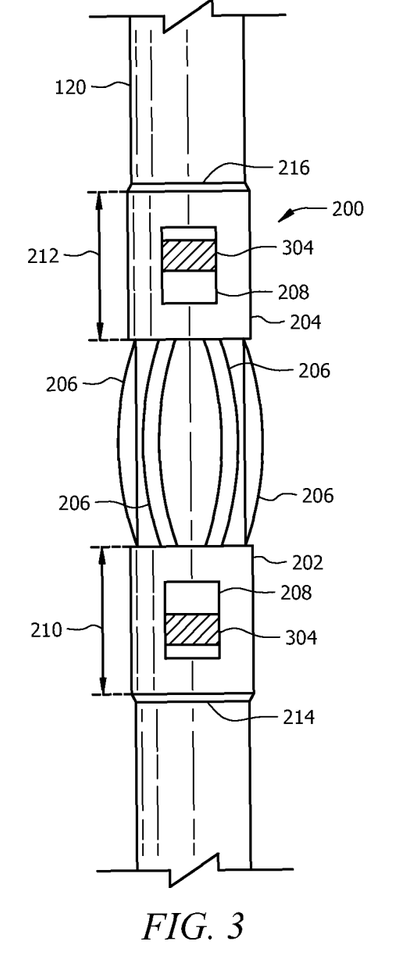
FIG. 3 is a plan view of a centralizer according to another embodiment.

Referring now to FIG. 3, an embodiment of the centralizer 200 is shown in greater detail. As described above, the centralizer 200 comprises a first body portion 202, a second body portion 204, and a plurality of bow springs 206 connecting the first body portion 202 to the second body portion 204. The first body portion 202 and the second body portion 204 may be made from steel or similar high strength material. In an embodiment, the first body portion 202 and the second body portion 204 may be made from a composite material. The first body portion 202 and the second body portion 204 may be generally cylindrical in shape and may have an internal diameter selected to be disposed about the exterior of a wellbore tubular to which they are to be coupled. The first body portion 202 and the second body portion 204 may have a desired length 210, 212 based on the mechanical requirements of the of the centralizer 200 and taking into account the material of construction and the size and shape of the one or more windows 208 disposed in at least the first body portion 202. The one or more windows 208 are described in more detail below. In an embodiment the length 210 of the first body portion 202 and the length 212 of the second body portion 204 may be the same or different. The leading and/or trailing edges 214, 216 of the first body portion 202 and/or the second body portion 204 may be tapered or angled to aid in movement of the centralizer 200 through the wellbore (e.g., through a close tolerance restriction).

A plurality of bow springs 206 may connect the first body portion 202 to the second body portion 204. The bow springs 206 may be made from steel (e.g., spring steel), a composite, or any other high strength material. Any number of bow springs 206 may be used to connect the first body portion 202 and the second body portion 204. The number of bow springs 206 may be chosen based on the wellbore tubular properties (e.g., weight, size), the wellbore properties (e.g., orientation, tortuosity, etc.), the wellbore service conditions (e.g., heat, acidity, etc.), and/or the annular diameter difference available in the close tolerance restrictions. The number of bow springs 206 may also be chosen to reduce the starting and/or drag forces while increasing the restoring force available within the wellbore. The bow springs 206 may generally extend longitudinally between the first body portion 202 and the second body portion 204. However, additional orientations may be used depending on the desired use of the centralizer. For example, helical and/or angled orientations are also possible. The bow springs 206 may generally have an arced profile between the first body portion 202 and the second body portion 204, though any suitable shape (e.g., recurved) imparting a standoff from the wellbore tubular and a desired restoring force may be used. Each of the bow springs 206 may comprise the same materials, shapes, and orientation. In an embodiment, each bow spring or any combination of the plurality of bow springs may comprise different materials, shapes, and orientation.

Figure 6:
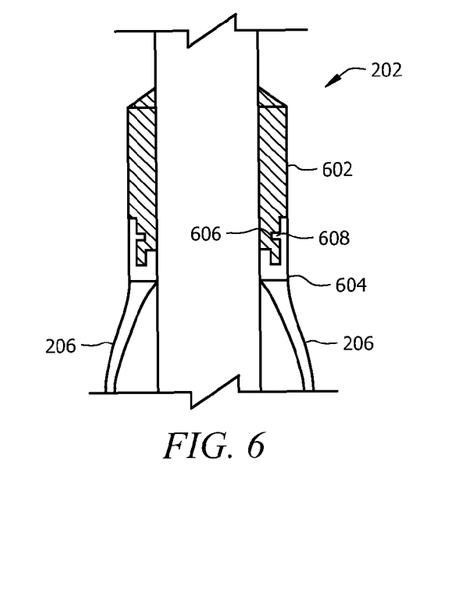
FIG. 6 is a cross sectional view of a rotatable coupling according to an embodiment.

The bow springs 206 may be connected to the first body portion 202 and the second body portion 204 using any means known in the art. For example, the bow springs 206 may be welded, brazed, diffusion bonded, connected using a connector, and/or integrally formed along with the first body portion 202 and the second body portion 204. In an embodiment, the bow springs 206 may be rotatably coupled to the first body portion 202 and/or the second body portion 204. In this embodiment, any type of connection allowing for relative movement may be used to connect the bow springs 206 to the first body portion 202 and/or the second body portion 204. For example, the bow springs 206 may be connected to the first body portion 202 and/or the second body portion 204 using an interlocking sleeve. The interlocking sleeve may comprise a race disposed on the first body portion 202 and/or the second body portion 204 and a corresponding interlocking track disposed on each of the plurality of bow springs 206. In an embodiment shown in FIG. 6, the plurality of bow springs 206 may be connected to a collar 604 that has an interlocking track 606 capable of interlocking with a race 608 disposed on the first body portion 202. In an embodiment, one or more bow springs 206 and/or an interlocking collar may be used with the first body portion 202, the second body portion 204, and/or any of a plurality of body portions disposed between the first body portion 202 and the second body portion 204. The ability for the bow springs 206 to rotate about a longitudinal axis with respect to the first body portion 202 and/or the second body portion 204, and thus rotate with respect to the wellbore tubular 120, may help prevent damage to the bow springs 206 upon a rotation of the wellbore tubular in the wellbore (e.g., bending a bow spring, breaking a bow spring off of the centralizer, etc.).

As shown in FIG. 3, at least one window 208 disposed in the first body portion 202 may be used to couple the centralizer 200 to a wellbore tubular 120. The wellbore tubular 120 may be longitudinally disposed within the centralizer 200. The window 208 disposed in the first body portion 202 may comprise a cutout of the first body portion 202 that allows for access through the first body portion 202. An upset 304 may be created within the window 208 to couple the centralizer 200 to the wellbore tubular 120. The window 208 may comprise any shape including, but not limited to, square, rectangular, and oval. When the window has a shape with sharp corners, the corners may be rounded to prevent the formation of a stress concentration during use. For example, when a rectangular window is used, the interior corners of the window may be rounded. The size of the windows may be chosen to allow for the creation of an upset of sufficient size to maintain the mechanical coupling between the centralizer 200 and the wellbore tubular 120. In an embodiment, the first body portion 202 may comprise a plurality of windows 208. In an embodiment, both the first body portion 202 and the second body portion 204 may comprise one or more windows 208.

Figure 4:
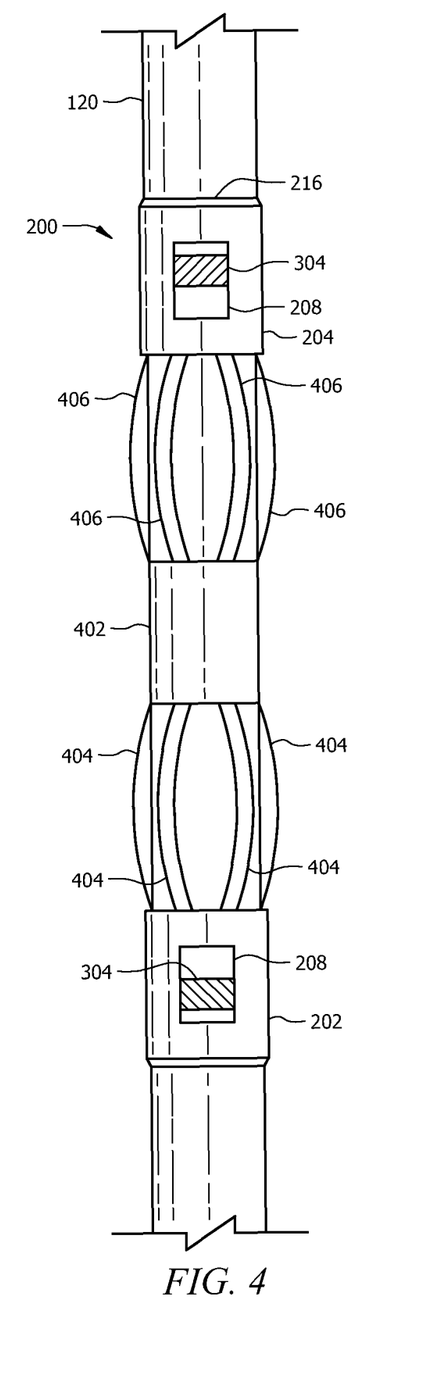
FIG. 4 is a plan view of a centralizer according to still another embodiment.

In an embodiment shown in FIG. 4, a third body portion 402 may be disposed between a first portion 404 of the plurality of bow springs and a second portion 406 of the plurality of bow springs. The third body portion 402 may be similar in design to the first body portion 202 and/or the second body portion 204. The first portion 404 of the bow springs and the second portion 406 of the bow springs may be connected to the third body portion 402 using any of the means disclosed herein. While not shown in FIG. 4, the third body portion 402 may comprise one or more windows with an associated upset disposed therein when disposed about a wellbore tubular 120. A window disposed in the third body portion 402 may serve to prevent rotation of the third body portion 402 about the wellbore tubular 120. In an embodiment, the first portion 404 of the bow springs and/or the second portion 406 of the bow springs may be rotatably coupled to the third body portion 402 to allow for independent, longitudinal rotation of the first portion 404 of the bow springs and/or the second portion 406 of the bow springs about the wellbore tubular 120. Any configuration allowing rotation between one or more portions of the bow springs and one or more body portions, for example as described with respect to FIG. 6 above, may be used. It will be appreciated that while a third body portion 402 is illustrated, any number of additional body portions may be disposed between subsequent portions of the bow springs to connect the first body portion 202 to the second body portion 204. The use of additional body portions may allow for additional bow springs to be used with the centralizer 200 to obtain the desired centralizer properties such as starting force, restoring force, and drag force. In an embodiment, the use of multiple body portions to allow for additional bow springs between the first body portion 202 and the second body portion 204 may increase the restoring force without a corresponding increase in the starting force, allowing for the desired properties to be tailored based on the design of the centralizer 200.

Referring again to FIG. 3, an upset 304 may be disposed within the window 208 to provide the mechanical force to couple the centralizer 200 to the wellbore tubular 120. The upset 304 may generally have a shape corresponding and/or complimentary to the shape of the window 208 within which it is disposed. As used herein, the height of the upset refers to the standoff distance of the upset from the wellbore tubular, the length of the upset refers to the dimension of the upset in the longitudinal direction of the wellbore tubular, and the width of the upset refers to the dimension of the upset in a direction perpendicular to the longitudinal direction of the wellbore tubular. In an embodiment, the upset may have a different shape than the window within which it is disposed. The size of the upset 304 may be chosen based on the material and method of manufacturing of the upset 304 and may generally be sized to fit in the window within which it is disposed. The mechanical properties of the upset 304 may be based on the total surface area between the upset 304 and the wellbore tubular 120, the height of the upset 304, and the composition of the upset 304. For example, when a composite material is used to form the upset 304, the total surface area between the composite material and the wellbore tubular 120 may determine the bonding strength of the upset 304 to the wellbore tubular 120. The sides of the upset 304 and the window 208 may be substantially perpendicular to the longitudinal axis of the centralizer 200 to allow for an interaction between the surfaces over a broader surface area and to allow the force imparted on the upset to be substantially tangential to the surface of the wellbore tubular 120. Additional considerations for the upset geometry are described below.

Figure 5:
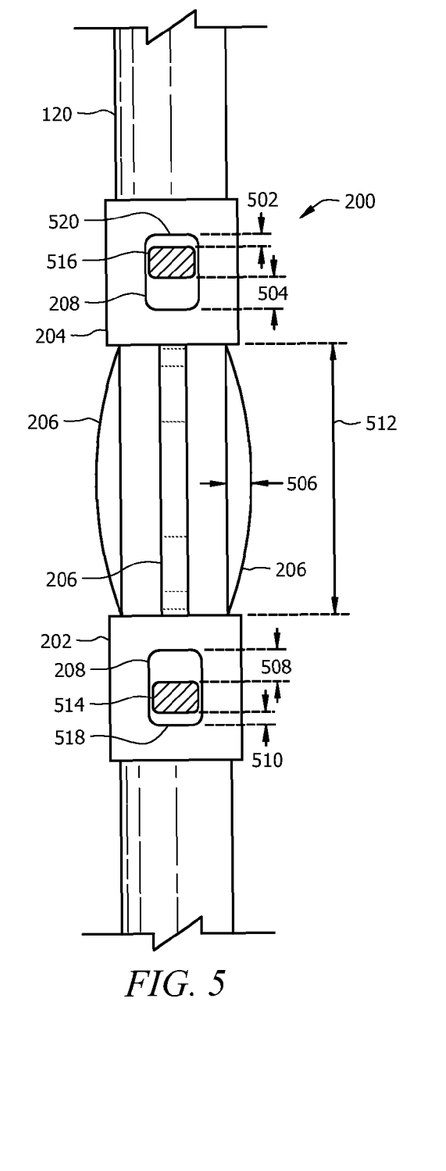
FIG. 5 is a plan view of a centralizer according to yet another embodiment.

The size of the upset 304 and the corresponding window 208 within which it is disposed may be chosen to allow the first body portion 202 and/or the second body portion 204 to move longitudinally and/or rotationally relative to the wellbore tubular 120 upon compression or decompression of the bow springs 206. As shown in FIG. 5, the radial, inward compression of the bow springs 206 creates a longitudinal lengthening of the distance 512 between the first body portion 202 and the second body portion 204, thus increasing the overall length of the centralizer 200. The increase in length of the centralizer 200 is approximately the same as or greater than the radial distance 506 traveled by bow spring 206 during the compression. In order to accommodate this longitudinal travel, the window 208 may be designed so that the sum of the distances 504 and 508 are equal to or greater than the greatest radial travel distance 506 of the plurality of bow springs 206. In an embodiment, the sum of the distances 504 and 508 may be about 5% to about 10% greater than the distance 506 to allow for production tolerances during coupling of the centralizer 200 to the wellbore tubular 120.

Figure 7:
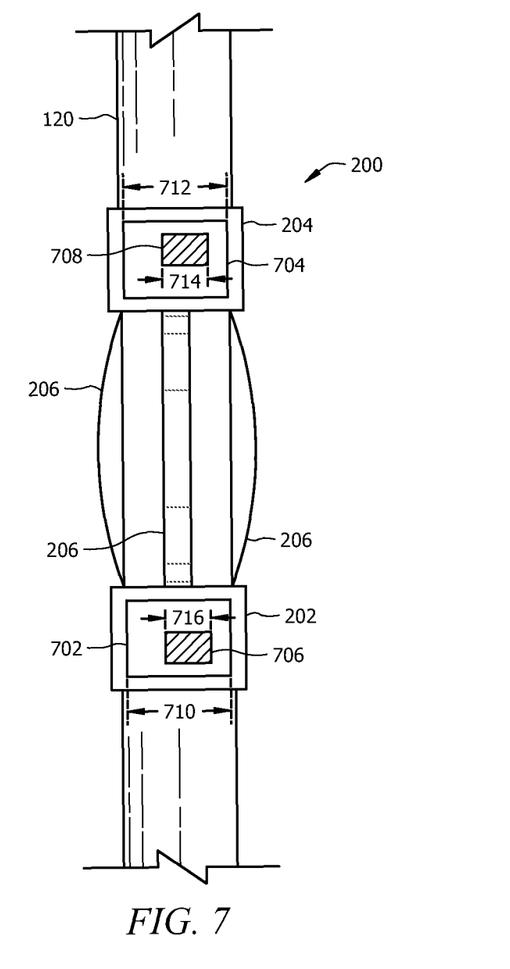
FIG. 7 is a plan view of a centralizer according to another embodiment.

In an embodiment shown in FIG. 7, the window 702 in the first body portion 202 and/or the window 704 in the second body portion 204 may be sized to allow movement in a longitudinal and/or rotational direction. In this embodiment, the distance 710 in the first body portion 202 may be greater than the width 716 of the upset 706, and/or the distance 712 in the second body portion 204 may be greater than the width 714 of the upset 708. This sizing may allow a limited amount of rotational movement of the centralizer 200 about the wellbore tubular 120, which may be in addition to the longitudinal movement of the centralizer 200 along the wellbore tubular 120. In an embodiment, the centralizer 200 may have one or more windows sized to allow for rotational movement of a body portion with respect to the upset in addition to having one or more bow springs 206 rotatably coupled to one or more body portions. Allowing a limited amount of rotational movement of the centralizer about the wellbore tubular 120 by appropriately sizing one or more windows and one or more corresponding upsets may help prevent damage to the centralizer 200 as the centralizer 200 passes through the wellbore (e.g., passing through a close tolerance restriction).

Returning to an embodiment shown in FIG. 5, the centralizer 200 is pulled into the wellbore by the interaction of the upset 514, 516 and the window 208. For example, the centralizer 200 may be pulled into the wellbore as the wellbore tubular 120 is conveyed into the wellbore due to the interaction of the upset 514, which is fixedly coupled to the wellbore tubular 120, contacting the edge 518 of the window 208 in the first body portion 202. Similarly, the centralizer may be pulled out of the wellbore as the wellbore tubular 120 is conveyed out of the wellbore due to the interaction of the upset 516, which is fixedly coupled to the wellbore tubular 120, contacting the edge 520 of the window 208 in the second body portion 204. In order for the centralizer 200 to be pulled into the wellbore, the distance 510 should be less than the distance 504. In an embodiment comprising windows in both the first body portion 202 and the second body portion 204, the distance 502 should be less than the distance 508 to allow the centralizer 200 to be pulled in the opposite direction in the wellbore. By pulling the centralizer 200 into the wellbore, rather than pushing the centralizer 200 into the wellbore, the starting force required to insert the centralizer 200 into a restriction (e.g., a close tolerance restriction) may be reduced. The starting force generally refers to the force required to insert the centralizer into the interior of the wellbore and/or the interior of a casing or other wellbore tubular disposed within the wellbore. Pulling may reduce the starting force by allowing the bow springs to be radially compressed without also being longitudinally compressed, as would occur if the centralizer where pushed into a restriction. Pulling the centralizer 200 during conveyance within the wellbore may also be advantageous in preventing potential damage and/or collapse of the centralizer 200 within the wellbore upon contacting an obstruction or close tolerance restriction.

Returning to FIG. 2, the height 152 of the first body portion 202, the second body portion 204, and/or the upset 304 may vary depending on the width of the annulus available between the wellbore tubular 120 and the side of the wellbore or the inner surface 166 of the casing, depending on whether or not the wellbore has been cased. Due to the tolerances available within a wellbore, a well operator may specify a minimum tolerance for the space between the outermost surface 168 of a wellbore tubular 120, including the centralizer 200, and the inner surface 166 of the wellbore or the casing disposed within the wellbore. Using the tolerance, the height of the first body portion 202, the second body portion 204, and/or the upset may be less than the annular diameter difference minus the tolerance set by the well operator. In an embodiment, the tolerance may be about 0.1 inches to about 0.2 inches. In an embodiment, no tolerance may be allowed other than the pipe manufacturer's tolerances, which may be based on industry standards (e.g., American Petroleum Institute (API) standards applicable to the production of a wellbore tubular), of about 1% based on the outer diameter of the wellbore tubular 120 and the drift tolerance of the inner diameter of the close tolerance restriction present in the wellbore (e.g., a casing through which the wellbore tubular comprising the centralizer passes). The minimum height of the first body portion 202, the second body portion 204, and/or the upset 304 may be determined based on the structural and mechanical properties of the first body portion 202, the second body portion 204, and/or the upset 304. The height of each of the first body portion 202, the second body portion 204, and the upset 304 may the same or different. The height of the corresponding upset and body portion pair may generally be similar to allow for a sufficient interference between the upset and the edge of the window in the body portion to apply the required force to pull the centralizer 200, alone or in combination with additional upset and window pairs, into the wellbore. In an embodiment, the height of the upset 304 may be less than or equal to the height of the first body portion 202, the second body portion 204, or both.

The upset 304 may comprise any material capable of retaining the centralizer 200 on the wellbore tubular 120 during conveyance of the wellbore tubular 120 within the wellbore. The upset may comprise a metal, an alloy, a composite, a ceramic, a resin, an epoxy, or any combination thereof. The upset 304 may be disposed within the windows using any known techniques for applying the desired material. For example, a flame spray method, sputtering, welding, brazing, diffusion bonding, casting, molding, curing, or any combination thereof may be used to apply the upset within the window.

In some embodiments, the upset comprises a composite material. The composite material may comprise a ceramic based resin including, but not limited to, the types disclosed in U.S. Patent Application Publication Nos. US 2005/0224123 A1, entitled "Integral Centraliser" and published on Oct. 13, 2005, and US 2007/0131414 A1, entitled "Method for Making Centralizers for Centralising a Tight Fitting Casing in a Borehole" and published on Jun. 14, 2007. For example, in some embodiments, the resin material may include bonding agents such as an adhesive or other curable components. In some embodiments, components to be mixed with the resin material may include a hardener, an accelerator, or a curing initiator. Further, in some embodiments, a ceramic based resin composite material may comprise a catalyst to initiate curing of the ceramic based resin composite material. The catalyst may be thermally activated. Alternatively, the mixed materials of the composite material may be chemically activated by a curing initiator. More specifically, in some embodiments, the composite material may comprise a curable resin and ceramic particulate filler materials, optionally including chopped carbon fiber materials. In some embodiments, a compound of resins may be characterized by a high mechanical resistance, a high degree of surface adhesion and resistance to abrasion by friction.

In some embodiments, the composite material may be provided prior to injection and/or molding as separate two-part raw material components for admixing during injection and/or molding and whereby the whole can be reacted. The reaction may be catalytically controlled such that the various components in the separated two parts of the composite material will not react until they are brought together under suitable injection and/or molding conditions. Thus, one part of the two-part raw material may include an activator, initiator, and/or catalytic component required to promote, initiate, and/or facilitate the reaction of the whole mixed composition. In some embodiments, the appropriate balance of components may be achieved in a mold by use of pre-calibrated mixing and dosing equipment.

In an embodiment, the centralizer may be attached to the wellbore tubular by placing the centralizer on the wellbore tubular and disposing the upset within the window in the first body portion and/or the second body portion. In other words, a sequential two-step process may be used to form an in situ upset. In an embodiment, a composite upset may be formed directly on the wellbore tubular through the use of a mold. In this process, the surface of the wellbore tubular accessible through the window may be prepared using any known technique to clean and/or provide a suitable surface for bonding the composite material to the wellbore tubular. In an embodiment, the surface of the wellbore tubular may be metallic, for example steel. The attachment surface may be prepared by sanding, sand blasting, bead blasting, chemically treating the surface, heat treating the surface, or any other treatment process to produce a clean surface for bonding the composite to the wellbore tubular. In an embodiment, the preparation process may result in a corrugation, stippling, or otherwise roughening of the surface, on a microscopic or macroscopic scale, to provide an increased surface area and suitable surface features to improve bonding between the surface and the composite resin material.

The prepared surface may then be covered with an injection mold. The injection mold may be suitably configured to provide the shape of an upset with an appropriate height. The injection mold may be provided with an adhesive on a surface of the mold that contacts the wellbore tubular. It will be appreciated that the adhesive described in this disclosure may comprise any suitable material or device, including, but not limited to, tapes, glues, and/or hardenable materials such as room temperature vulcanizing silicone. The injection mold may be sealed against the prepared surface within the window. Following such generally sealing against the prepared surface, the composite material described herein may be introduced into a space between the injection mold and the prepare surface using a port disposed in the injection mold. The composite material may flow throughout the mold and form an upset on the surface of the wellbore tubular.

The composite material may be allowed to harden and/or set. For example, heat may be applied to thermally activate a thermally setting resin, or allowing a sufficient amount of time for the curing of the composite material. After the composite material has sufficiently hardened and/or set, the injection mold may be unsealed from the wellbore tubular. The wellbore tubular comprising the centralizer may then be placed within a wellbore.

In an embodiment, a plurality of centralizers may be used with one or more wellbore tubular sections. A wellbore tubular string refers to a plurality of wellbore tubular sections connected together for conveyance within the wellbore. For example, the wellbore tubular string may comprise a casing string conveyed within the wellbore for cementing. The wellbore casing string may pass through the wellbore prior to the first casing string being cemented, or the casing string may pass through one or more casing strings that have been cemented in place within the wellbore. In an embodiment, the wellbore tubular string may comprise premium connections, flush connections, and/or nearly flush connections. One or more close tolerance restrictions may be encountered as the wellbore tubular string passes through the wellbore or the casing strings cemented in place within the wellbore. A plurality of centralizers as described herein may be used on the wellbore tubular string to centralize the wellbore tubular string as it is conveyed within the wellbore. The number of centralizers and their respective spacing along a wellbore tubular string may be determined based on a number of considerations including the properties of each centralizer (e.g., the restoring force, the starting force, the drag force, etc.), the properties of the wellbore tubular (e.g., the sizing, the weight, etc.), and the properties of the wellbore through which the wellbore tubular is passing (e.g., the annular diameter difference, the tortuosity, the orientation of the wellbore, etc.). In an embodiment, a wellbore design program may be used to determine the number and type of the centralizers based on the various inputs as described herein. The number of centralizers and the spacing of the centralizers along the wellbore tubular may vary along the length of the wellbore tubular based on the expected conditions within the wellbore.

In an embodiment, a plurality of centralizers comprising a first body portion, a second body portion, a plurality of bow springs connecting the first body portion to the second body portion, and at least one window in the first body portion may be placed on a wellbore tubular string using an upset disposed in each window. The wellbore tubular string may then be placed in the wellbore disposed in a subterranean formation. In an embodiment, the wellbore may comprise at least one close tolerance restriction within the wellbore.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A centralizer system comprising:
   a centralizer comprising:
      a first body portion;
      a second body portion;
      a plurality of bow springs connecting the first body portion to the second body portion; and
      a window disposed in the first body portion;
   a wellbore tubular disposed longitudinally within the first body portion, the second body portion, and the plurality of bow springs; and
   an upset disposed on the surface of the wellbore tubular and within the window, wherein the width of the window is greater than the width of the upset and is configured to allow rotational movement of the centralizer about the wellbore tubular with respect to the upset.

2. The centralizer system of claim 1, further comprising a second window disposed in the second body portion.

3. The centralizer system of claim 1, further comprising a third body portion disposed between a first portion of the plurality of bow springs and a second portion of the plurality of bow springs.

4. The centralizer system of claim 3, further comprising a second window disposed in the third body portion.

5. The centralizer system of claim 4, further comprising a second upset disposed on the surface of the wellbore tubular and within the second window.

6. The centralizer system of claim 1, wherein the window has rounded corners.

7. The centralizer system of claim 1, wherein the plurality of bow springs are rotatably coupled to the first body portion or the second body portion.

8. The centralizer system of claim 1, wherein no collar stops are disposed about the wellbore tubular to restrain the movement of the centralizer.

9. The centralizer of system claim 1, wherein the axial length of the window is greater than the axial length of the upset by at least one half of the height of the bows from the wellbore tubular outer diameter.

10. A method comprising:
    providing a centralizer disposed about a wellbore tubular comprising an upset disposed on a surface of the wellbore tubular, wherein the centralizer comprises:
       a first body portion;
       a second body portion;
       a plurality of bow springs connecting the first body portion to the second body portion, wherein the plurality of bow springs is rotatably coupled to the first body portion while being axially constrained with respect to the first body portion; and
       a window disposed in the first body portion;
       wherein the upset is disposed within the window;
    placing wellbore tubular in a wellbore disposed in a subterranean formation.

11. The method of claim 10, wherein the upset comprises a metal, an alloy, a polymer, a composite, or any combination thereof.

12. The method of claim 10, wherein the wellbore comprises at least one close tolerance restriction.

13. The method of claim 12, wherein the close tolerance restriction comprises a restriction with an annular diameter difference of between about 1.5 inches and about 0.125 inches.

14. The method of claim 12, wherein the close tolerance restriction results from a flush connection, a premium connection, or any combination thereof.

15. The method of claim 10, wherein the wellbore tubular comprises a tubular string, and wherein the tubular string further comprises a plurality of centralizers disposed about the tubular string.

16. The method of claim 10, wherein the plurality of bow springs are rotatably coupled to the first body portion and the second body portion.

17. The method of claim 10, wherein the centralizer further comprises a third body portion disposed between a first portion of the plurality of bow springs and a second portion of the plurality of bow springs.

18. The method of claim 10, wherein the wellbore tubular comprises a casing, a drill pipe, coiled tubing, production tubing, or a rod string.

19. The method of claim 10, wherein a height of the upset is less than a height of the first body portion or the second body.

20. The method of claim 10, wherein the width of the window is greater than the width of the upset, and wherein the method further comprises rotating the centralizer about the wellbore tubular while maintaining the upset in the window.

* * * * *

UNITED STATES PATENT AND TRADEMARK OFFICE
Certificate

Patent No. 8,505,624 B2                                        Patented: August 13, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Iain Levie, Spring, TX (US); and Jean Buytaert, Mineral Wells, TX (US).

Signed and Sealed this Twentieth Day of May 2014.

DAVID J. BAGNELL
*Supervisory Patent Examiner*
Art Unit 3672
Technology Center 3600